United States Patent
Yang

(10) Patent No.: US 8,549,343 B2
(45) Date of Patent: *Oct. 1, 2013

(54) TIMING RECOVERY APPARATUS AND METHOD THEREOF

(75) Inventor: Chih-Chieh Yang, Taipei (TW)

(73) Assignee: Mediatek Inc., Hsin-Chu (TW)

(*) Notice: Subject to any disclaimer, the term of this patent is extended or adjusted under 35 U.S.C. 154(b) by 169 days.

This patent is subject to a terminal disclaimer.

(21) Appl. No.: 13/237,756

(22) Filed: Sep. 20, 2011

(65) Prior Publication Data

US 2012/0008725 A1 Jan. 12, 2012

Related U.S. Application Data

(63) Continuation of application No. 12/352,025, filed on Jan. 12, 2009, now Pat. No. 8,046,623.

(51) Int. Cl.

| | |
|---|---|
| *G06F 1/00* | (2006.01) |
| *G06F 1/04* | (2006.01) |
| *H03K 5/01* | (2006.01) |
| *H04J 3/24* | (2006.01) |
| *H04N 7/12* | (2006.01) |
| *H04N 5/932* | (2006.01) |
| *H04N 7/16* | (2011.01) |
| *H04M 11/00* | (2006.01) |
| *G06K 9/36* | (2006.01) |

(52) U.S. Cl.
USPC ........... 713/500; 713/600; 327/165; 327/291; 370/474; 375/240.28; 379/88.13; 382/232; 386/201; 725/143

(58) Field of Classification Search
USPC ......... 713/500, 600; 327/165, 291; 370/474; 375/240.28; 379/88.13; 382/232; 386/201; 725/143
See application file for complete search history.

(56) References Cited

U.S. PATENT DOCUMENTS

| 5,790,543 A | 8/1998 | Cloutier |
|---|---|---|
| 7,630,407 B2 | 12/2009 | Compton et al. |
| 7,657,645 B2 | 2/2010 | Xu |

(Continued)

FOREIGN PATENT DOCUMENTS

| WO | WO 2004/010670 | 1/2004 |
|---|---|---|
| WO | WO 2007/088482 | 8/2007 |

OTHER PUBLICATIONS

"MPEG-2, systems part, 2nd edition;" ITU Study Group 16—Video Coding Experts Group—ISO/IEC MPEG & ITU-T VCEG(ISO/IEC JTC1/SC29/WG11 and ITU-T SG16 Q6), XX, XX, No. 13818-1:2000; Feb. 1, 2000, XP030001501; pp. 22,23, & 115-123.

*Primary Examiner* — Stefan Stoynov

(74) *Attorney, Agent, or Firm* — McClure, Qualey & Rodack, LLP

(57) ABSTRACT

A multimedia processing system for processing a program stream containing a program clock reference information. The system comprises a clock generator, a timer, a modifier, a processing unit, a parser and a compensator. The clock generator generates a clock signal. The timer receives the clock signal and generates a time information. The modifier incorporates a timing reference information into the program stream, wherein the timing reference information is provided according to the time information and the program clock reference information. The processing unit processes the program stream to generate a data stream incorporated with the timing reference information. The parser extracts the timing reference information from the data stream. And, the compensator generates a control signal according to the timing reference information. Wherein the clock generator receives the control signal and adjusts the clock signal.

13 Claims, 9 Drawing Sheets

(56) References Cited

U.S. PATENT DOCUMENTS

| | | |
|---|---|---|
| 7,710,965 B2 | 5/2010 | Liu et al. |
| 7,778,277 B2 | 8/2010 | Yang |
| 8,085,889 B1 * | 12/2011 | Narayan et al. ............... 375/346 |
| 8,208,500 B2 * | 6/2012 | Philips et al. ................. 370/516 |
| 8,411,569 B2 * | 4/2013 | Matthews .................... 370/232 |
| 2007/0286245 A1 | 12/2007 | Yamada |
| 2008/0126825 A1 | 5/2008 | Yang |
| 2008/0145020 A1 | 6/2008 | Tsuruga |

* cited by examiner

TIMING RECOVERY APPARATUS AND METHOD THEREOF

CROSS REFERENCE TO RELATED APPLICATIONS

This application is a Continuation of U.S. application Ser. No. 12/352,025, filed on Jan. 12, 2009, the entirety of which is incorporated by reference herein.

BACKGROUND OF THE INVENTION

1. Field of the Invention

The invention relates to a timing recovery apparatus and method thereof, and more particularly, to a timing recovery apparatus and method thereof for a multimedia processing system.

2. Description of the Related Art

FIG. 1a shows a conventional multimedia processing system 100, e.g. multimedia processing system, coupled to a peripheral processing unit 110, e.g. CableCARD. The CableCARD 110 is a device externally detachable to the multimedia processing system 100. Paid programs are typically encrypted, thus, CableCARD 110 is provided to authorize users for decrypting the encrypted programs. In multimedia processing system 100, an input node, for example a tuner/demodulator 102, receives a transmission signal #RF to obtain an encrypted stream #ED containing a program. The CableCARD 110 decrypts the encrypted stream #ED and outputs a decrypted stream #DS. A processor 104 in the multimedia processing system 100 then processes the decrypted stream #DS based on a clock signal #CLK generated from an oscillator 120 so as to display the program. According to the MPEG standard, the transmission signal #RF comprises program packets and a plurality of program clock reference #PCR as an indication of relative timing of the program packets. Thereby, the program can be correctly displayed. Conventionally, the oscillator 120 is designed to synchronous with a transmitter (not shown) from which the transmission signal #RF is sent. The accuracy of oscillator 120 affects the frame rate of the decrypted stream #DS during playback. If the oscillator 120 is not synchronous to the transmitter, the data flow of the decrypted stream #DS may underrun or overrun, causing undesirable jitters. To ensure oscillator 120 synchronize with the transmitter, the multimedia processing system 100 further comprises a system timer 130, a parser 140 and a compensator 150. The system timer 130 is driven by the clock signal #CLK provided from oscillator 120 to generate a time value #T. The parser 140 receives the output from CableCARD 110 and extracts program clock references #PCR from the decrypted stream #DS. The compensator 150 performs timing recovery by observing variation of the program clock reference #PCR on a basis of the time value #T. In normal cases, the difference between the time value #T and program clock reference #PCR is a constant value. If the oscillator 120 is inaccurate, an error value between the program clock reference #PCR and the time value #T gradually increases, and the compensator 150 adjusts the oscillator 120 by generating a control voltage $\Delta V$ to converge the error.

FIG. 1b is a flowchart of the conventional timing recovery method for a multimedia processing system. The data flow between the multimedia processing system 100 and CableCARD 110 can be summarized as follows. In step 101, the tuner/demodulator 102 receives a transmission signal #RF and outputs an encrypted stream #ED to the CableCARD 110. In step 103, the CableCARD 110 decrypts the encrypted stream #ED to generate a decrypted stream #DS. In step 105, the processor 104 processes the decrypted stream #DS to display the program. In step 107, program clock reference #PCR is extracted for timing recovery performed by the compensator 150 to maintain accuracy of the oscillator 120. The program clock reference #PCR, however, may not be a good reference for timing recovery because the decrypted stream may not a stable flow. For example, the time for decrypting of each program packet may be varied. Furthermore, when the multimedia processing system 100 is implemented to support multi-channel mode, packets of each channel may simultaneously be received and queued before sequential processing by CableCARD 110. The queued time is also variable, so the program clock reference #PCR obtained in the parser 140 is no more clock dependent. If the irregular program clock reference #PCR is used to perform timing recovery of the oscillator 120, undeterminable errors such as jitters may occur. Thus, an enhanced timing recovery is desirable.

BRIEF SUMMARY OF THE INVENTION

An exemplary embodiment, a multimedia processing system for processing a program stream is provided. The program stream contains a program clock reference information. The system comprises a clock generator, a timer, a modifier, a processing unit, a parser and a compensator. The clock generator generates a clock signal. The timer receives the clock signal and generates a time information. The modifier incorporates a timing reference information into the program stream, wherein the timing reference information is provided according to the time information and the program clock reference information. The processing unit processes the program stream to generate a data stream incorporated with the timing reference information. The parser extracts the timing reference information from the data stream. And, the compensator generates a control signal according to the timing reference information. Wherein the clock generator receives the control signal and adjusts the clock signal.

In another exemplary embodiment, a timing recovery method is provided. The timing recovery method comprises the following steps: providing a program stream wherein the program stream comprising program clock reference information; generating a clock signal; generating a time information according to the clock signal; incorporating a timing reference information into the program stream, wherein the timing reference information is provided according to the time information and the program clock reference information; processing the program stream to generate a data stream incorporated with the timing reference information; extracting the timing reference information from the data stream; generating a control signal according to the timing reference information; and adjusting the clock signal according to the control signal.

Yet, in another exemplary embodiment, a timing recovery apparatus is provided. The timing recovery apparatus comprises a clock generator, a timer, a modifier, a parser, and a compensator. The clock generator generates a clock signal. The timer generates a time information according to the clock signal. The modifier incorporates a timing reference information into a program stream, wherein the program stream comprising program clock reference information, wherein the timing reference information is provided according to the time information and the program clock reference information. The parser extracts the timing reference information from the program stream. And, the compensator generates a control signal according to the timing reference information. Wherein the clock generator receives the control signal and adjusts the clock signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2b shows an embodiment of the muxer in FIG. 2a;

FIG. 2c shows an embodiment of the first flow controller in FIG. 2a;

FIG. 4b shows an embodiment of the muxer in FIG. 4a; and

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
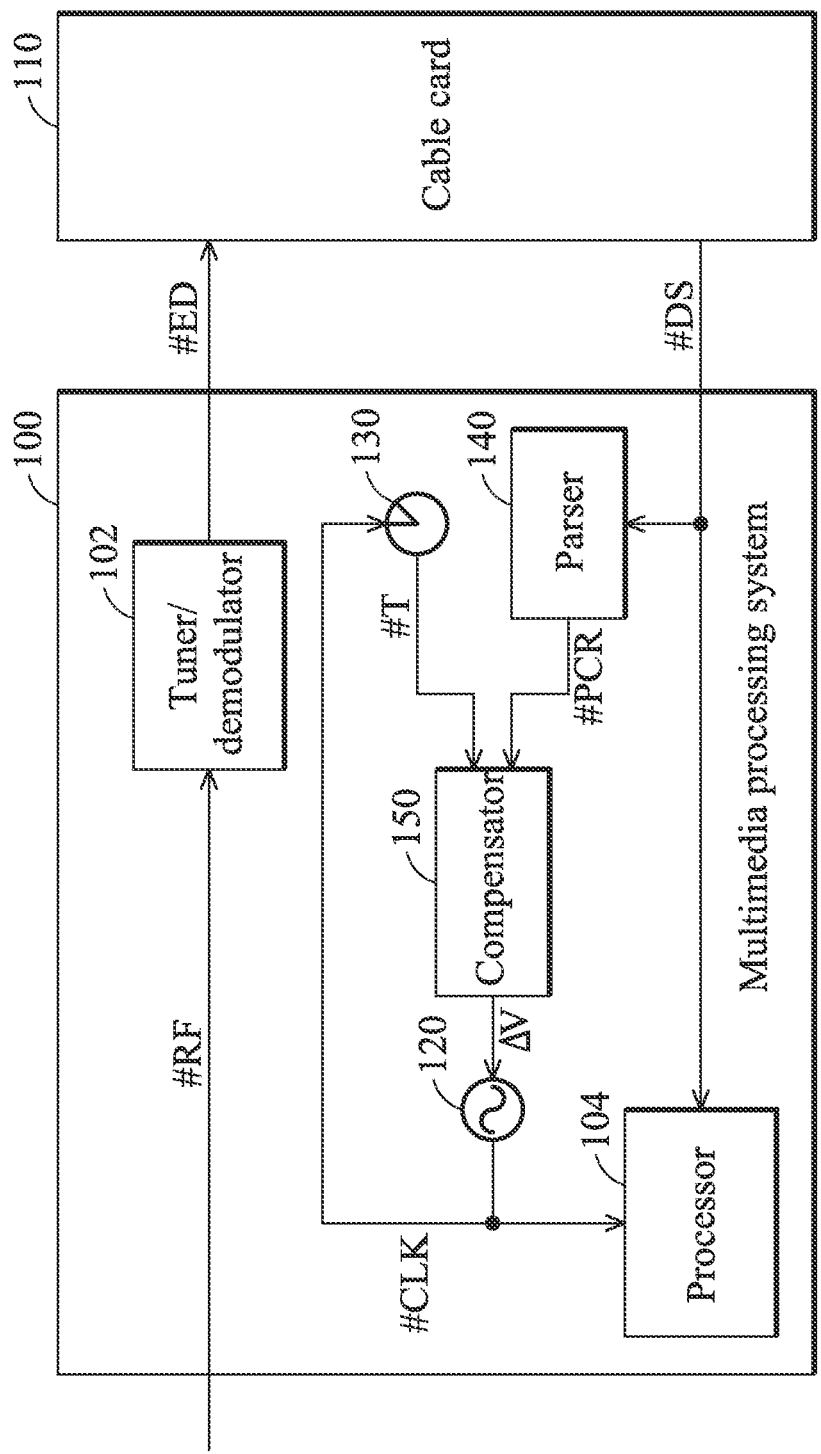
FIG. 1a shows a conventional multimedia processing system coupled to a peripheral processing unit.
Figure 1B:
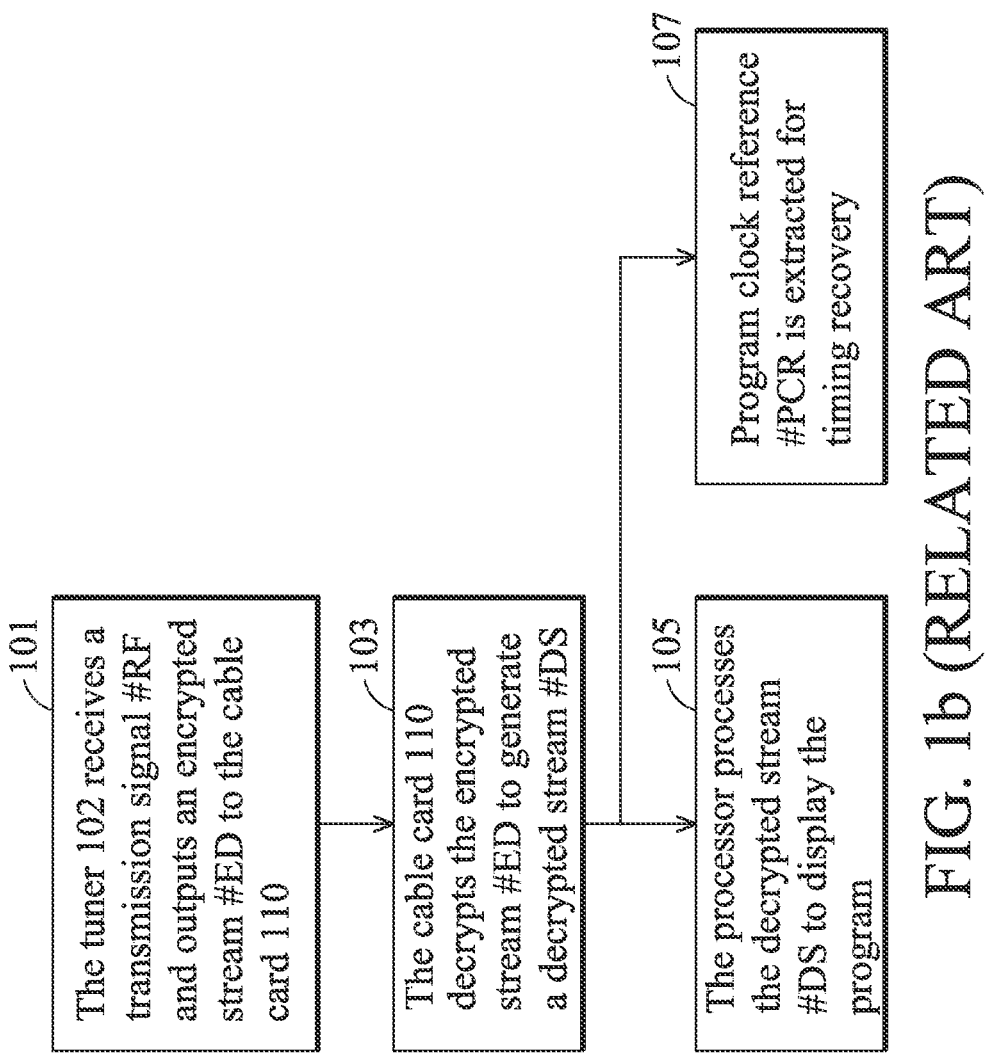
FIG. 1b is a flowchart of the conventional timing recovery method for video data process.
Figure 2A:
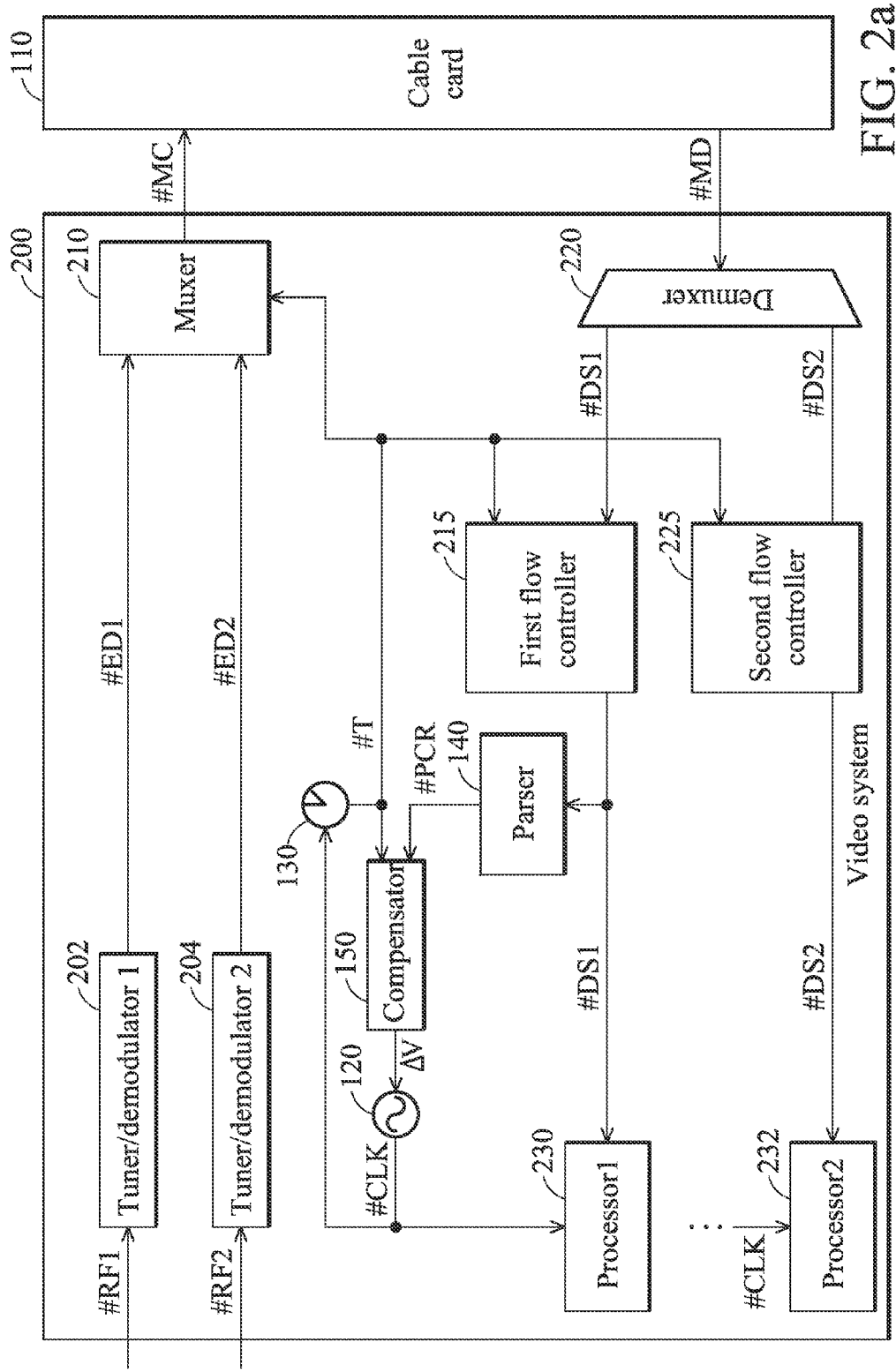
FIG. 2a shows an embodiment of a multimedia processing system utilizing a first flow controller and a second flow controller.

FIG. 2a shows an embodiment of a multimedia processing system 200 utilizing a first flow controller 215 and a second flow controller 225. The multimedia processing system 200 is a multi-mode architecture receiving multiple programs. In the multimedia processing system 200, a first input node 202, for example a first tuner/demodulator, receives a first transmission signal #RF1 from a first channel to output a first encrypted stream #ED1. Similarly, a second input node 204, foe example a second tuner/demodulator, receives a second transmission signal #RF2 of a second channel to output a second encrypted stream #ED2. In another embodiment, in current digital transmission technology, the first encrypted stream #ED1 and the second encrypted stream #ED2 may transmitted in the same channel, and could be provided via the same transmission signal. Because the interface of CableCARD 110 can only accept one bit stream, therefore muxer 210 is provided for merging the first encrypted stream #ED1 and the second encrypted stream #ED2 into a mixed stream #MC. In other words, the first and second encrypted streams #ED1 and #ED2 are respectively buffered in a muxer 210 and serially output to the CableCARD 110 by turns. The packets of the first encrypted stream #ED1 and second encrypted stream #ED2 in the mixed stream #MC are arranged according to their reception time. Since the program clock reference #PCR is an essential parameter for timing recovery, the undeterminable queued times in the muxer 210 and decryption times in the CableCARD 110 should be estimated to restore clock dependency of the program clock reference #PCR.

Thus, when the program clock reference #PCR of the first encrypted stream #ED1 is received, the muxer 210 refers to the time value #T generated from a system timer 130 to get a first reception time. And the muxer 210 stamps the first reception time of the program clock reference #PCR to the first encrypted streams #ED1. Similarly, when the program clock reference #PCR of the second encrypted stream #ED2 is received, the muxer 210 refers to the time value #T generated from a system timer 130 to get a second reception time. And the muxer 210 stamps the second reception time to the first encrypted streams #ED1. Various compensation methods, described in the following, are provided to make use of the time stamps.

The CableCARD 110 decrypts the encrypted mixed stream #MC therein to return a mixed decrypted stream #MD, and a demuxer 220 in the multimedia processing system 200 de-multiplexes the mixed decrypted stream #MD to generate a first data stream #DS1 and a second data stream #DS2 corresponding to each program. In the embodiment, a first processor 230 and a second processor 232 respectively process the first and second data stream #DS1 and #DS2 based on the clock signal #CLK generated from an oscillator 120 so as to display the program of desired frame rates.

As described, problems may occur because the program clock references #PCR are irregular after output from the demuxer 220. With reference to the reception times stamped in the encrypted streams, a first flow controller 215 and a second flow controller 225 are provided to regulate the first data stream #DS1 and second data stream #DS2. The first and second flow controllers 215 and 225 perform identical processes, so only the first flow controller 215 is described as an example for the sake of brevity. The first flow controller 215 controls the first data stream #DS1, ensuring packet output from the first flow controller 215 to have a substantially fixed latency in relation to the first encrypted stream #ED1. For example, the first flow controller 215 reads the first reception time stamped by the muxer 210 from the first data stream #DS1, and buffers the first data stream #DS1. The first flow controller 215 then reads time value #T generated from the system timer 130. When the time value #T reaches a time point having a fixed latency in relation to the reception time, the first flow controller 215 outputs the first data stream #DS1 to the first processor 230. In this way, program clock references #PCR in the first and second data stream #DS1 and #DS2 are regulated to have substantially constant time delay in relation to their reception times, such that jitters can be avoided. A parser 140, coupled to the output of first flow controller 215, extracts the program clock references #PCR from the first data stream #DS1 outputted from the first flow controller 215. And a compensator 150 can then perform accurate timing recovery with the clock dependent program clock references #PCR.

Figure 2B:
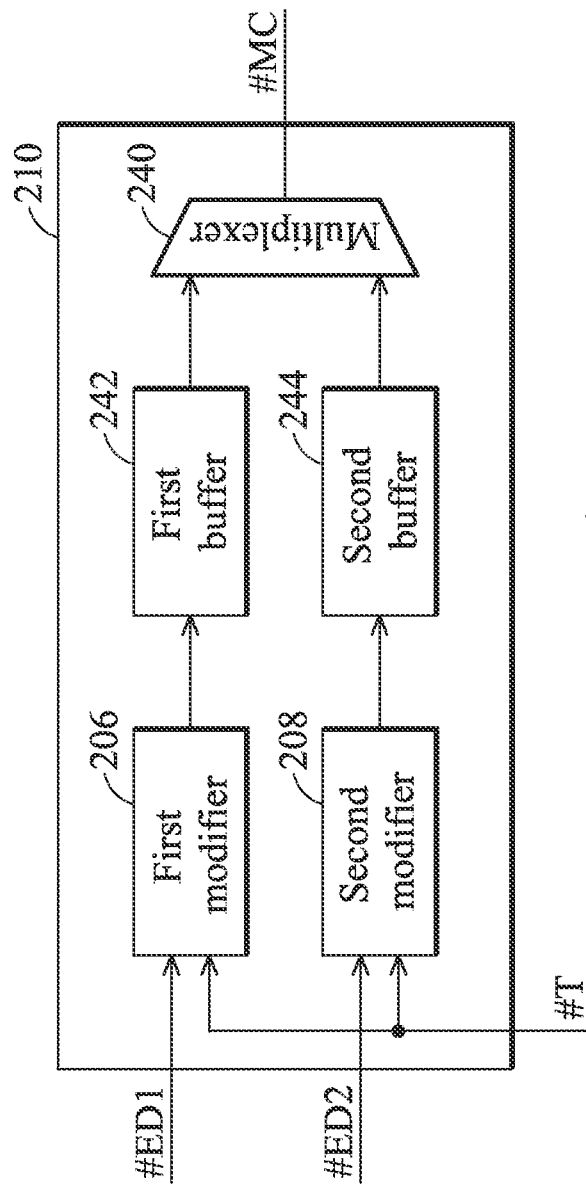

FIG. 2b shows an embodiment of the muxer 210 in FIG. 2a. The muxer 210 includes a first buffer 242 and second buffer 244 for buffering the first and second encrypted streams #ED1 and #ED2 respectively. Every packet may stay in the buffer for an irregular duration, thus, the original program clock references #PCR fail their clock dependency. Before buffering the packets, a stamping process is performed. For a first encrypted stream #ED1, a first modifier 206 receives the first encrypted stream #ED1 from the first tuner/demodulator 202 and inserts a first time value #T1 to its packet header. The first time value #T1, indicating the reception time of the program clock references #PCR of the first encrypted stream #ED1. The first time value #T1 may be inserted in a preserved field of the packet header. A second modifier 208 performs identical stamp insertion to the second encrypted stream #ED2, with a second time value #T2 indicating the reception time of the program clock references #PCR of the second encrypted stream #ED2. Thereafter, a multiplexer 240 reads contents in the first buffer 242 and second buffer 244 by turns to output the mixed stream #MC.

Figure 2C:
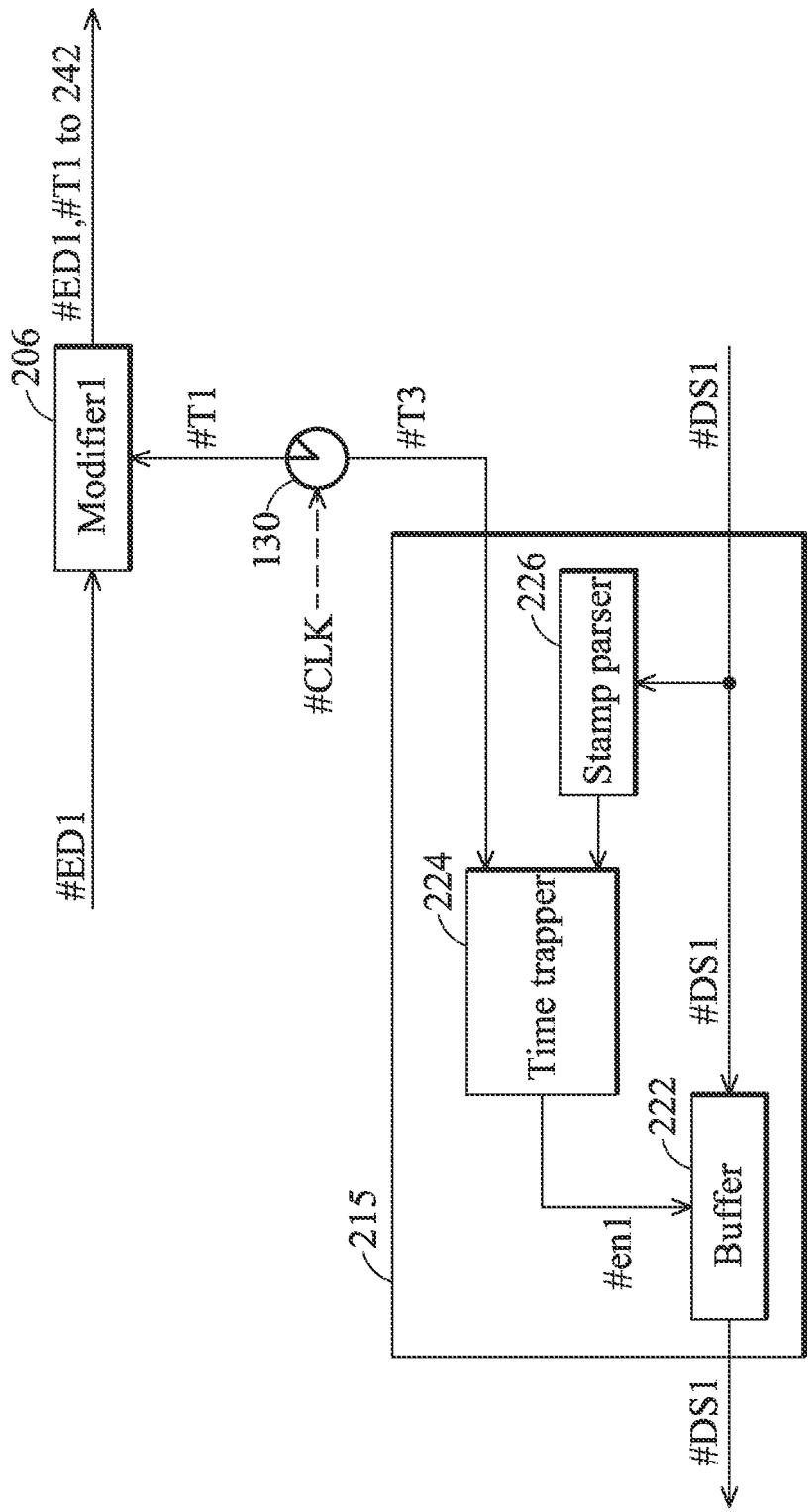

FIG. 2c shows an embodiment of the first flow controller 215 in FIG. 2a. The reception time of the first encrypted stream #ED1, denoted as first time value #T1, is inserted to the first encrypted stream #ED1 by the first modifier 206. After decryption, a time irregular first data stream #DS1 sent from the demuxer 220 is temporarily buffered in a stream buffer 222. A stamp parser 226 extracts the first time value #T1 from the first data stream #DS1. A time trapper 224 is coupled to the system timer 130 to receive a local time value #T3, and is coupled to the stamp parser 226 to receive the first time value #T1. As time passes, the difference between stamped first time value #T1 and local time value #T3 gradually changed. The time trapper 224 sends an enable signal #en1 to the stream buffer 222 upon the difference of stamped first time value #T1 and local time value #T3 reaches a fixed interval. The stream buffer 222 does not output the first data stream #DS1 until receipt of the enable signal #en1. Because the time value #T1 and time value #T3 are generated by the same system timer 130 driven by the oscillator 120, their regularity are reliable enough to maintain the fixed interval.

Figure 3:
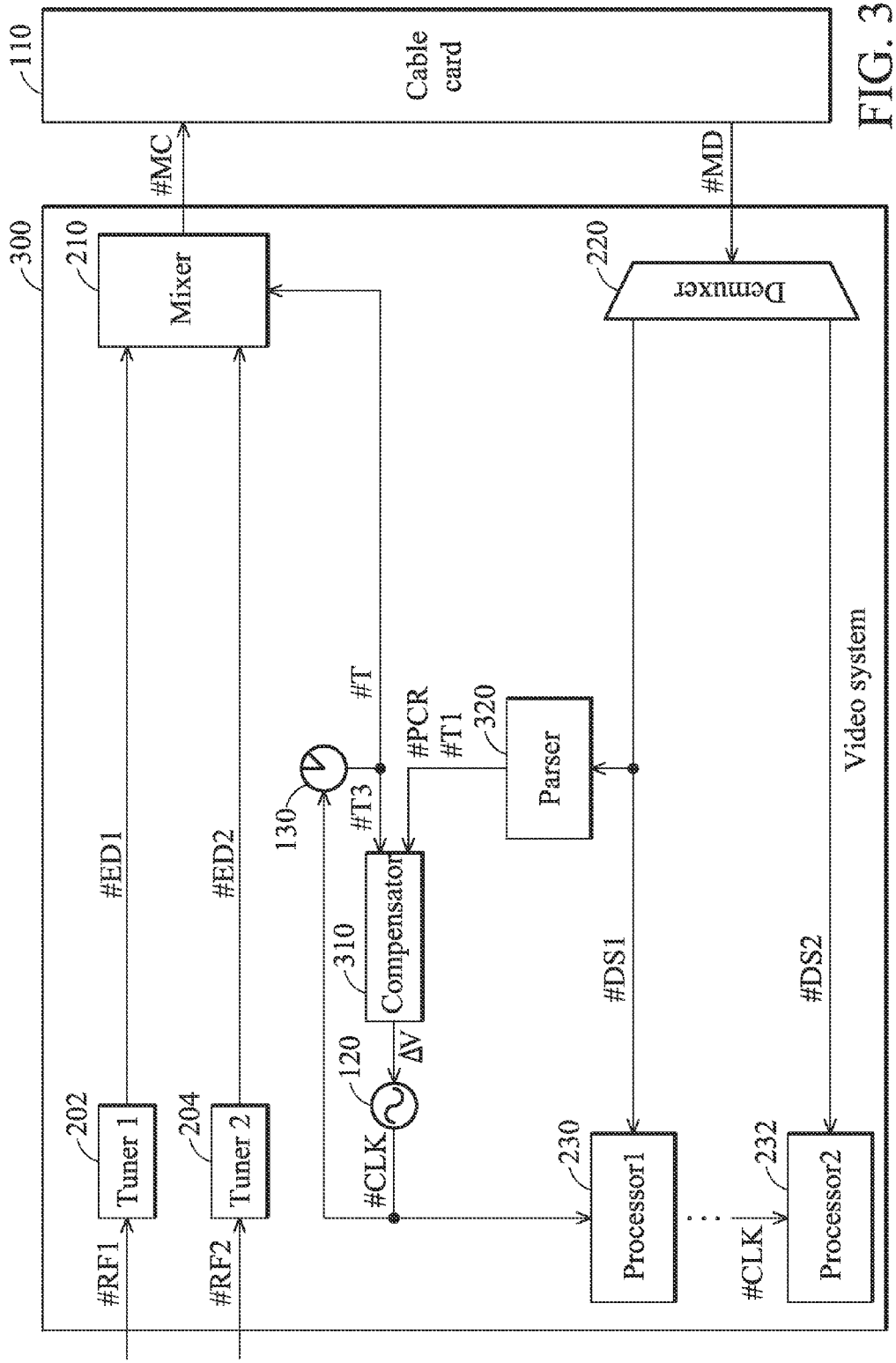
FIG. 3 shows another embodiment of the multimedia processing system.

FIG. 3 shows another embodiment of the multimedia processing system 300, making use of the stamped reception times in another way. For example, a parser 320 capable of extracting both the first time value #T1 and program clock reference #PCR from the first data stream #DS1. The compensator 310 generates a control voltage ΔV according to the difference between the program clock reference #PCR and the stamped first time value #T1. And the Oscillator 120 receives the control voltage ΔV to adjust the clock signal #CLK. Thus, no first flow controller 215 or second flow controller 225 is utilized in this architecture. In an ideal case, the difference between the stamped first time value #T1 and program clock reference #PCR is a constant value. However, if the oscillator 120 is inaccurate, an error value between the program clock reference #PCR and the first time value #T1 gradually changes. Therefore, as described above, the embodiment of the invention utilizes the difference between the stamped first time value #T1 and program clock reference #PCR to adjust the clock signal #CLK.

In one embodiment of the invention, the compensator 310 may further include a filter to smooth the control voltage.

Figure 4A:
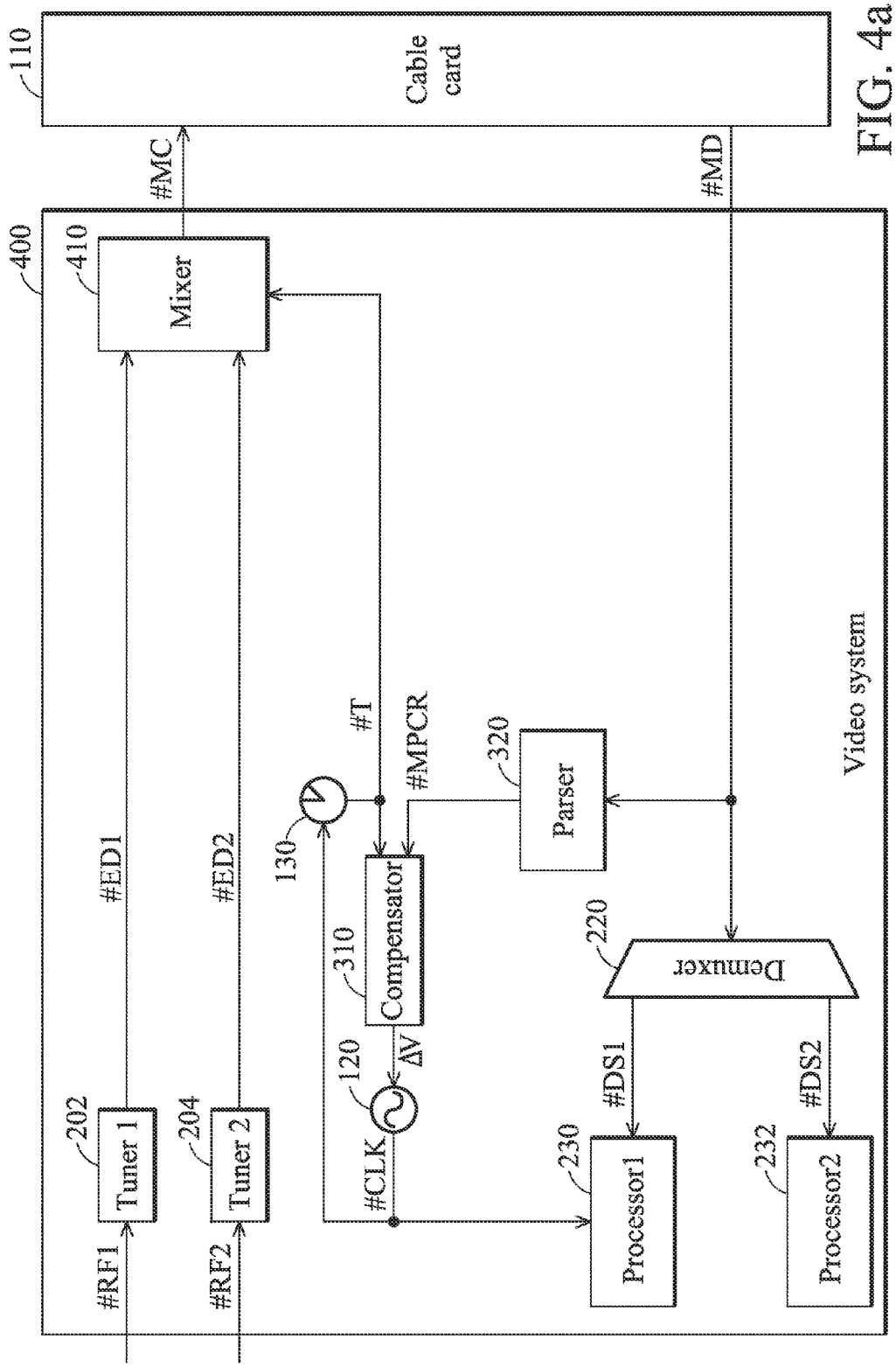
FIG. 4a shows an embodiment of the multimedia processing system.

FIG. 4a shows an embodiment of the multimedia processing system 400. In this embodiment, the parser 420 cable of optionally extracting information from the mixed decrypted stream #MD. Alternatively, the muxer 410 modifies the program clock reference #PCR with a modified program clock reference #MPCR. The modified program clock reference #MPCR is determined by subtracting the reception time value #T from the program clock reference #PCR when receiving the program clock reference #PCR. Therefore, the parser 420 extracts the modified program clock reference #MPCR from the mixed decrypted stream #MD output from the CableCARD 110. Thus, first encrypted stream #ED1 and second encrypted stream #ED2, alone or in combination, can be a reference for timing recovery performed by the compensator 310 and parser 420.

Figure 4B:
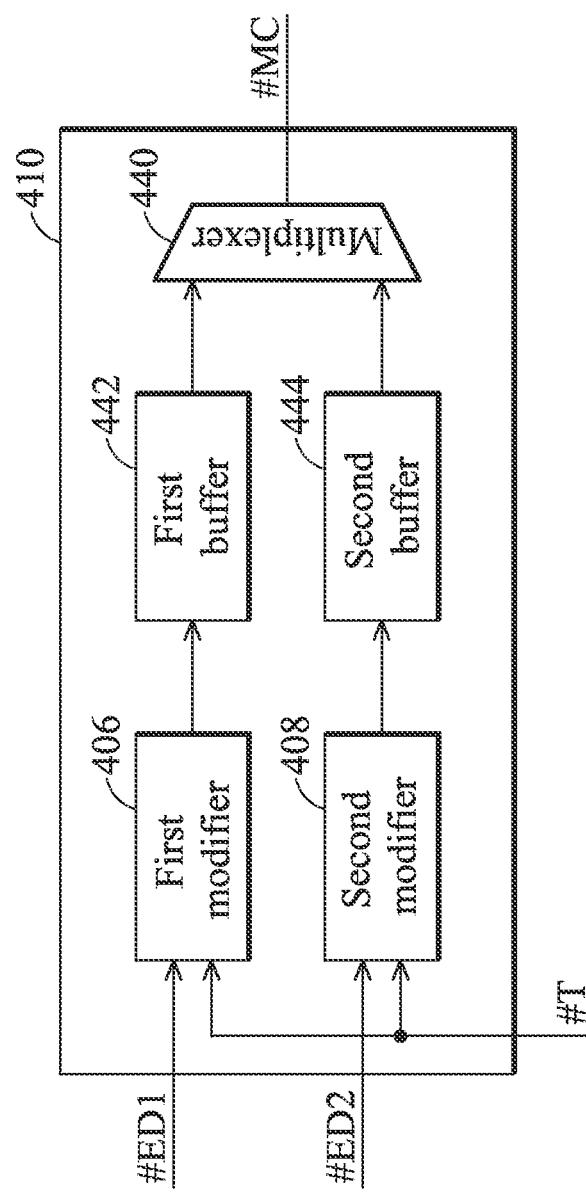

FIG. 4b shows an embodiment of the muxer 410 in FIG. 4a. The muxer 410 includes a first buffer 442 and second buffer 444 for buffering the first and second encrypted streams #ED1 and #ED2 respectively. Every packet may be buffered in the buffers for an irregular duration, thus, the original program clock references #PCR fail their clock dependency. Before buffering the packets, a modifying process is performed. For a first encrypted stream #ED1, a first modifier 406 receives the first encrypted stream #ED1 and modifies the first program clock reference #PCR1 with a first modified program clock reference #MPCR1. A first time value #T1 indicates the reception time of the first program clock reference #PCR1 of the first encrypted stream #ED1. The first modified program clock reference #MPCR1 is obtained by subtracting the first time value #T1 from the first program clock reference #PCR1. And a second modifier 408 performs identical modified operation to the second encrypted stream #ED2. Thereafter, a multiplexer 440 reads contents in the first buffer 442 and second buffer 444 by turns to output the mixed stream #MC.

Figure 5:
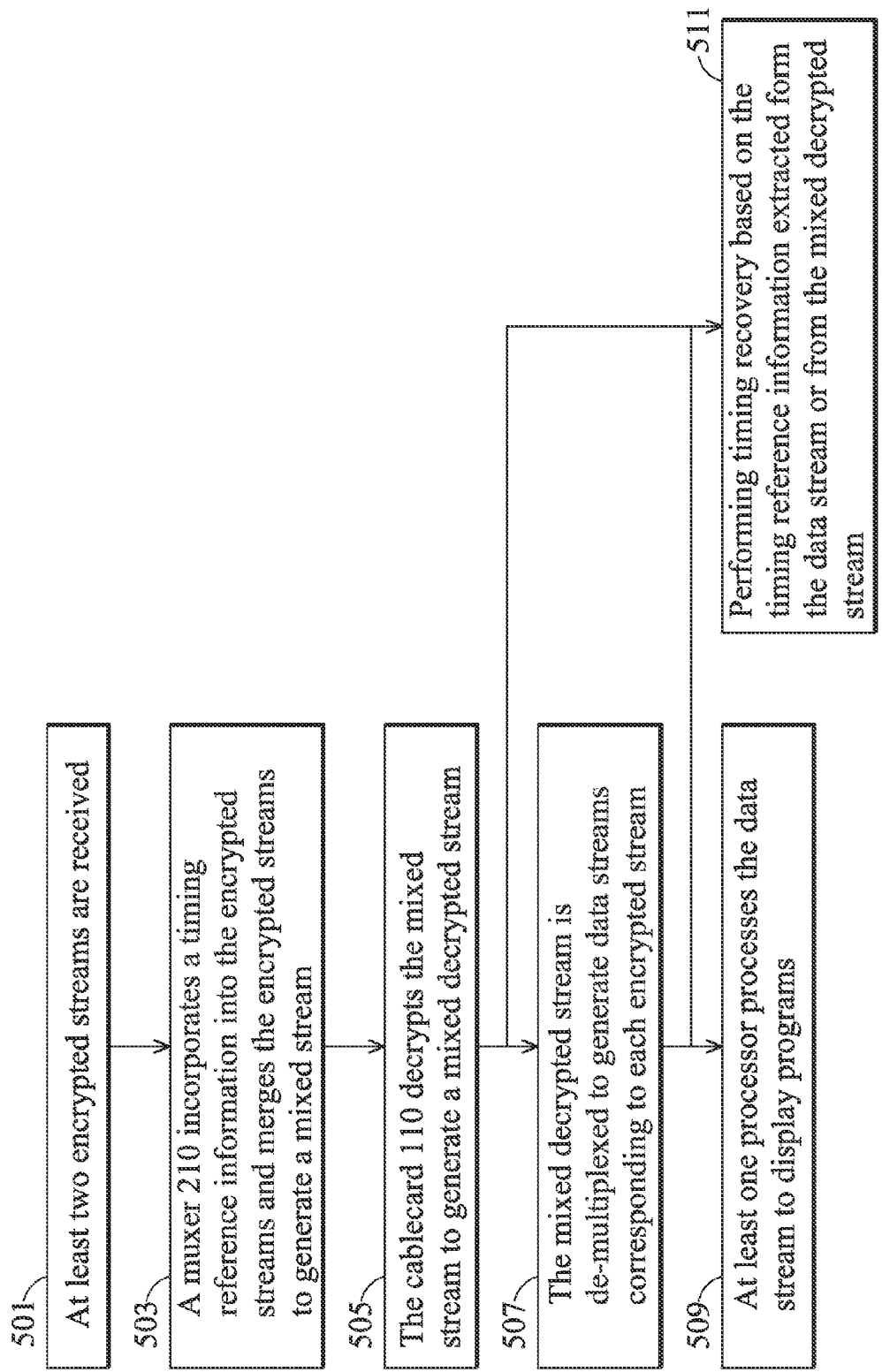
FIG. 5 is a flowchart of timing recovery method for a video data process according to the invention.

FIG. 5 is a flowchart of timing recovery method for a video data process according to the invention. The embodiments described in FIGS. 2a, 3 and 4a can be summarized as follows. In step 501, at least two encrypted streams are received. In step 503, a muxer 210 incorporates a timing reference information into the encrypted streams and merges the encrypted streams to generate a mixed stream. In step 505, the CableCARD 110 decrypts the mixed stream to generate a mixed decrypted stream. In step 507, the mixed decrypted stream is de-multiplexed to generate data streams corresponding to each encrypted stream. In step 509, at least one processor processes the data stream so as to display programs. Step 511 may be processed optionally before or after step 507, performing timing recovery based on the timing reference information extracted form the data stream or from the mixed decrypted stream. In the embodiments of FIG. 2a and FIG. 3, the timing reference information is a reception time value when the program clock references #PCR of the encrypted stream is received. In the embodiments of FIG. 4a, the timing reference information is a modified program clock references #MPCR.

The invention provides a timing recovery method used in multi-mode multimedia processing systems. The method is also applicable to any device having data flow irregularity problems. The multimedia processing system 200 may be a data stream processing device, and the CableCARD 110 may also be any decryption device or special processing unit.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multimedia processing system for processing a program stream wherein the program stream comprising a program clock reference information, the system comprising:
a clock generator for generating a clock signal;
a timer receiving the clock signal for generating a time information;
a modifier for incorporating a timing reference information into the program stream, wherein the timing reference information is provided according to the time information and the program clock reference information;
a processing unit for processing the program stream to generate a data stream incorporated with the timing reference information;
a flow controller, coupled to the processing unit and the timer, for buffering the data stream, wherein the flow controller outputs the buffered data stream when the time information reaches a time point having a fixed latency in relation to the timing reference information;

a parser for extracting the timing reference information from the data stream;

a compensator for generating a control signal according to the timing reference information; and a first processor for processing the data stream according to the clock signal;

wherein the clock generator receives the control signal and adjusts the clock signal.

2. The multimedia processing system as claimed in claim 1, wherein the flow controller comprises:

a buffer for buffering the data stream;

a timing reference information parser for extracting the timing information from the data stream; and a time trapper for generating an enable signal when the time information reaches a time point having a fixed latency in relation to the timing reference information;

wherein the buffer outputs the buffered data stream according to the enable signal.

3. The multimedia processing system as claimed in claim 1, wherein the timing reference information is the time information when the program clock reference information is received.

4. The multimedia processing system as claimed in claim 1, wherein the timing reference information is modified program clock reference information, wherein the modified program clock reference information is determined by subtracting the time information from the program clock reference information when the program clock reference information is received.

5. The multimedia processing system as claimed in claim 1, further comprising:

a multiplexer for multiplexing the program stream and a sub-program stream to generate a mixed program stream, wherein the processing unit processes the mixed program stream to generate a mixed data stream; and a de-multiplexer for de-multiplexing the mixed data stream to generate the data stream and a sub-data stream.

6. The multimedia processing system as claimed in claim 5, further comprising:

a second processor for processing the sub-data stream according to the clock signal.

7. A timing recovery method comprising:

providing a program stream wherein the program stream comprising program clock reference information;

generating a clock signal according to a control signal;

generating a time information according to the clock signal;

incorporating a timing reference information into the program stream;

processing the program stream to generate a data stream incorporated with the timing reference information;

buffering the data stream, wherein a flow controller outputs the buffered data stream when the time information reaches a time point having a fixed latency in relation to the timing reference information;

extracting the timing reference information from the data stream; and generating the control signal according to the timing reference information.

8. The timing recovery method as claimed in claim 7, wherein the timing reference information is the time information when the program clock reference information is received.

9. The timing recovery method as claimed in claim 7, wherein the timing reference information is modified program clock reference information, wherein the modified program clock reference information is determined by, when receiving the program clock reference information, subtracting the time information from the program clock reference information.

10. The timing recovery method as claimed in claim 7, further comprising:

multiplexing the program stream and a sub-program stream to generate a mixed program stream, wherein the mixed program stream is processed to generate a mixed data stream; and de-multiplexing the mixed data stream to generate the data stream and a sub-data stream.

11. A timing recovery apparatus comprising:

a clock generator for generating a clock signal according to a control signal;

a timer for generating a time information according to the clock signal;

a modifier for incorporating a timing reference information into a program stream, wherein the program stream comprising program clock reference information;

a flow controller, buffering the program stream, wherein the flow controller outputs the buffered program stream when the time information reaches a time point having a fixed latency in relation to the timing reference information;

a parser for extracting the timing reference information from the program stream; and a compensator for generating the control signal according to the timing reference information.

12. The timing recovery apparatus as claimed in claim 11, wherein the timing reference information is the time information when the program clock reference information is received.

13. The timing recovery apparatus as claimed in claim 11, wherein the timing reference information is a modified program clock reference information, wherein the modified program clock reference information is determined by, when receiving the program clock reference information, subtracting the time information from the program clock reference information.

* * * * *